United States Patent [19]

Alekhin et al.

[11] 4,323,445
[45] Apr. 6, 1982

[54] APPARATUS FOR ELECTROKINETICALLY SEPARATING DRILLING MUD

[76] Inventors: Stanislav A. Alekhin, Chilanzar, kvartal 24, dom 53, kv. 89; Eduard B. Kuznetsov, Chilanzar, Sektor E, dom 5, kv. 33; Vitold M. Bakhir, proezo Gaidara, 7, kv. 17; Vladimir I. Klimenko, Chilanzar, kvartal 23, dom 3, kv. 37; Jury G. Zadorozhny, Chilanzar, kvartal 2, dom 59, kv. 12, all of Tashkent, U.S.S.R.

[21] Appl. No.: 224,547

[22] PCT Filed: Feb. 27, 1980

[86] PCT No.: PCT/SU80/00031
    § 371 Date: Nov. 26, 1980
    § 102(e) Date: Nov. 25, 1980

[87] PCT Pub. No.: WO80/02045
    PCT Pub. Date: Oct. 2, 1980

[51] Int. Cl.³ ................ B01D 13/02; E21B 21/06; B01D 43/00; B03C 5/00
[52] U.S. Cl. .................. 204/300 R; 204/180 R; 204/299 R; 209/913; 210/214
[58] Field of Search ............ 204/180 R, 299 R, 300 R; 210/214; 209/913

[56] References Cited

U.S. PATENT DOCUMENTS

| | | | |
|---|---|---|---|
| 3,506,562 | 4/1970 | Coackley | 204/180 R X |
| 3,642,605 | 2/1972 | Chenel et al. | 204/300 R |
| 4,048,038 | 9/1977 | Kunkle | 204/180 R |
| 4,101,400 | 7/1978 | Pepping | 204/180 R |
| 4,170,529 | 10/1979 | Freeman | 204/180 R |
| 4,244,804 | 1/1981 | Moeglich | 204/300 R |

*Primary Examiner*—Arthur C. Prescott
*Attorney, Agent, or Firm*—McAulay, Fields, Fisher, Goldstein & Nissen

[57] ABSTRACT

An apparatus for electrokinetically separating drilling mud into liquid and solid phases comprising a casing (1) having an inlet (2) for drolling mud and outlets (3,13) for separated phases thereof and accommodating electrodes connected to the negative terminal and to the positive terminal, respectively, of a d-c source (8). The electrode connected to the negative terminal of the d-c source (8) comprises a conveyor screw (4) which has a cylindrical portion (5) and an adjacent conical portion (6). The casing (1) functions as the electrode connected to the positive terminal of the d-c source (8) and has respective cylindrical (10a, 10b, 10c) and conical (11) portions. The outlet (13) for solid phase of drilling mud is provided at the end of the conical portion (11) of the casing (1). There is provided a receptacle (14) for collecting solid phase of drilling mud communicating with the outlet (13) for solid phase of drilling mud provided in the casing (1).

6 Claims, 1 Drawing Figure

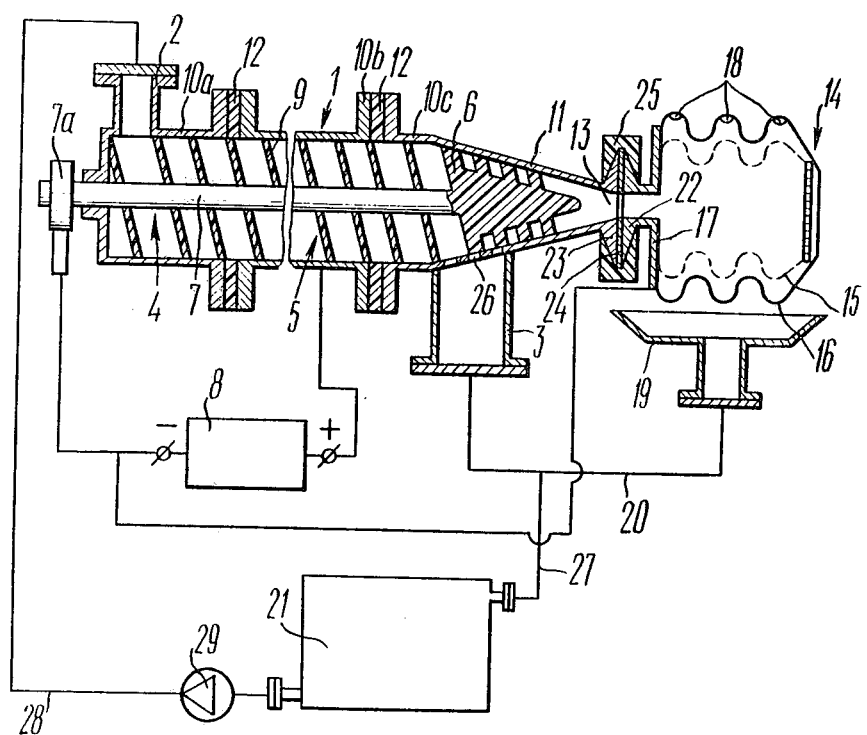

APPARATUS FOR ELECTROKINETICALLY SEPARATING DRILLING MUD

TECHNICAL FIELD

The present invention relates to the drilling techniques, and more particularly, to apparatus for electrokinetically separating drilling mud into liquid and solid phases.

BACKGROUND OF THE INVENTION

Known in the art is that drilling mud represents a heterogeneous liquid system inevitably containing colloidal solid phase particles. The present of these particles in drilling mud determines a number of rheological properties of drilling mud which are important from the viewpoint of well drilling quality. Therefore, the process for preparing drilling mud is essentially the process for preparing clayey slurries with the content of colloidal solid phase particles at a level at which necessary rheological properties of drilling mud are obtained. The degree of dispersion or comminution of clayey solid phase particles determine the quality of drilling mud being prepared. Reduction of the total quantity of solid phase in drilling mud with the same rheological properties of drilling mud contributes to an increase in the mechanical speed of drilling. This requires an improved degree of dispersion.

Drilling mud is prepared from high-grade dry mud, and expensive chemical reagents are added thereto for controlling and stabilizing pre-set properties of drilling mud. After the drilling is over, all drilling mud is disposed into a pile since its transportation to another drilling site is too expensive owing to high transport cost as drilling mud consists at 85-90% of water. A problem, therefore, arises to separate the most valuable fraction of drilling mud—finest colloidal fraction—which constitutes the basis of the structure of drilling mud, the more so as it is rich in chemical reagents added to drilling mud.

At present drilling mud is only cleaned during drilling. There are various apparatus for cleaning drilling mud during drilling.

Such known apparatus as vibratory screen, hydrocyclones and centrifugal apparatus separate coarse lumps of drillings from drilling mud, whereas finest colloidal particles remain thus impairing the properties of drilling mud. Thus a portion of drilling mud is to be disposed, the remaining portion is diluted with water and treated with chemical reagents for maintaining desired rheological parameters of drilling mud which are important for well drilling. After the drilling is over, the drilling mud is generally disposed.

It will be apparent that separation of colloidal particles of solid phase from drilling mud is of a substantial importance for the economical performance of well drilling.

Known in the art is an apparatus for separating stable colloidal clayey phase from drilling mud, wherein drilling mud leaving the well and containing drillings is preliminarily diluted with water, and coarse drillings are separated therefrom. Fine non-charged drillings and negatively charged colloidal clayey particles are present in such diluted and cleaned drilling mud. Then negatively charged clayey particles are separated from the drilling mud by depositing them on a rotary anode, with subsequent removal by means of a scraper. The deposited negatively charged clayey particles entrain with them a portion of non-charged particles which are also deposited on the rotary anode (cf. Czechoslovakian Pat. No. 109992, cl. 5a 31/20, issued on Feb. 12, 1964).

The above-described apparatus can only treat a portion of drilling mud, whereas the remaining and much greater portion thereof is fed back to the well without treatment.

Separation of solid phase particles only from a portion of drilling mud and the two-stage character of the process: first, separation of coarse particles, and then separation of finer particles, make the process complicated and expensive.

Known in the art is an apparatus for electrokinetically separating drilling mud into liquid and solid phases, wherein a casing has an inlet for drilling mud and outlets for separated phases of drilling mud and accommodates electrodes which are connected to terminals of a d-c source.

The electrode connected to the positive terminal of the d-c source comprises a chamber having a perforated wall which is connected to a closed circuit for a circulation of an electrically conducting liquid. The casing comprises the other electrode and is connected to the negative terminal of the d-c source. In operation circulating through the chamber is enriched with solid phase, and drilling mud which is within the casing and around the chamber is depleted therefrom. After several cycles of pumping of the electrically conducting liquid through the chamber the process of cleaning of the drilling mud is completed.

After that the electrically conducting liquid enriched with solid phase is drained and replaced by fresh liquid. New batch of drilling mud is poured in the casing of the apparatus, and the cleaning process continues (cf., the USSR Inventor's Certificate No. 662688, cl. E 21 B 21/00, 1978).

The need for circulating the electrically conducting liquid limits the amount of solid phase taken in thereby.

DISCLOSURE OF THE INVENTION

It is an object of the invention to provide an apparatus for electrokinetically separating drilling mud into liquid and solid phases, wherein the electrode connected to the negative terminal of a d-c source and the casing are so constructed as to substantially completely separate solid phase rich in chemical reagents so as to enable its utilization.

With this object in view, there is provided an apparatus for separating drilling mud into solid and liquid phases comprising a casing having an inlet for drilling mud and outlets for separated phases thereof and accommodating electrodes connected to the negative terminal and to the positive terminal, respectively, of a d-c source, wherein, according to the invention, the electrode which is connected to the negative terminal comprises a conveyor screw and has a cylindrical portion and an adjacent conical portion and the casing forms the electrode connected to the positive terminal and has respective cylindrical and conical portions, the outlet for solid phase of drilling mud being provided at the end of the conical portion of the casing, and wherein there is provided a receptacle for collecting solid phase of drilling mud communicating with the outlet for solid phase of drilling mud provided in the casing.

The receptacle for collecting solid phase preferably comprises two coaxially arranged containers made of a flexible corrugated material, the inner container being made of a reticulate electrically conducting material, connected to the negative terminal of the d-c source and communicating with the casing outlet for solid phase, and the outer container being made of a non-conducting material having openings for draining separated liquid phase.

Flexible corrugated structure of the receptacle for collecting solid phase which exhibits varying internal volume eliminates the formation of air pockets hampering the flow of electric current.

The provision of the inner container in the form of a reticulate cathode also prevents clayey particles from stricking to the walls of the inner container and contributes to an additional separation of liquid phase (filtrate), that is to further thickening of solid phase of the drilling mud.

The outlet for liquid phase of drilling mud is preferably arranged within the conical portion of the casing and is provided through a reticulate partition wall.

The provision of the outlet for liquid phase within the conical portion of the casing ensures most efficient separation of filtrate and thickening of solid phase of the drilling mud in the casing of the apparatus.

The cylindrical portion of the casing preferably consists of three parts of which the intermediate part is electrically insulated from the end parts and functions as an anode.

This construction ensures the provision of anode and cathode zones in the intermediate part of the casing, and as finest colloidal negatively charged particles are deposited on the anode, the deposition of the thickened part of drilling mud on the intermediate portion of the casing is most efficient.

The screw blades and the conical portion of the screw are preferably made of an insulating material and the screw shaft is made of an electrically conducting material.

This arrangement is needed to provide a uniform electric field within the apparatus.

A collector for separated liquid phase is preferably provided under the outer container.

This facility makes it possible to re-use the filtrate.

Therefore, the apparatus for separating solid phase of drilling mud from liquid phase (filtrate) provides for an efficient thickening of solid phase of drilling mud.

Substantial technical advantages of the apparatus according to the invention are achieved by using simple techniques and economical operations. A simple kinematic chain ensures a reliable operation of the apparatus according to the invention for separating solid phase of drilling mud from filtrate. The use of the invention makes it possible to obtain substantial savings of dry mud and chemical reagents.

BEST MODE FOR CARRYING OUT THE INVENTION

A specific embodiment of the invention will now be described with reference to the accompanying drawing, showing a diagrammatic view of an apparatus for electrokinetally separating drilling mud into solid and liquid phases, according to the invention, in longitudinal section (the screw drive not shown).

An apparatus for electrokinetically separating drilling mud into solid and liquid phases comprises a casing 1 having a pipe 2 connected thereto for an inlet of drilling mud, and a pipe 3 for an outlet of separated liquid phase of drilling mud. The casing 1 accommodates a conveyor screw 4 having a cylindrical portion 5 and an adjacent conical portion 6. A shaft 7 of the screw 4 is made of an electrically conducting material and is connected by means of a slip ring 7a to the negative terminal of a d-c source 8. Blades 9 of the screw 4 and the conical portion 6 of the screw are made of an insulating material. The casing 1 has a respective cylindrical portion consisting of interconnected parts 10a, 10b and 10c, and a respective conical portion 11. The intermediate part 10b is insulated from the end parts 10a and 10c by means of spacers 12 of an insulating material. The intermediate part 10b is connected to the positive terminal of the d-c source 8.

An outlet 13 for separated solid phase of drilling mud is provided at the end of the conical portion 11 of the casing 1. To this end adjoins a receptacle 14 for collecting colid phase of drilling mud which communicates with the outlet 13.

The receptacle 14 comprises two coaxially arranged containers—an inner container 15 and an outer container 16—made of a flexible corrugated material and having a common base 17. The containers 15 and 16 are installed in such a manner that an annular space is defined therebetween.

The inner container 15 is made of a reticulate electrically conducting material and is connected to the negative terminal of the d-c source so that it forms a cathode. The container 15 communicates with the outlet 13 of the casing 1.

The outer container 16 is made of a non-conducting material, connected to the base 17 and provided with openings 18 for draining the additionally separated liquid phase. A collector 19 communicating via a pipeline 20 with a tank 21 for drilling mud is provided under the outer container 16 for collecting this liquid phase.

The receptacle 14 and the casing 1 are interconnected by means of flanges 22 and 23, respectively, with the interposition of a gasket 24. The flanges are tied-up by means of a clamp 25 made of an insulating material.

The pipe 3 is connected to the casing 1 within the conical portion 11 thereof since it is within this portion that most efficient separation of liquid phase through a reticulate partition wall 26 takes place.

The tank 21 communicates, via a pipeline 27, with the pipe 3 and, via a pipeline 28 and a pump 29, with the pipe 2.

The apparatus for electrokinetically separating drilling mud according to the invention functions in the following manner.

When the apparatus is started, drives of the screw 4 and pump 29 (not shown) are turned on. Drilling mud to be treated is fed by the pump 29 through the pipeline 28 and the pipe 2 to the interior of the casing 1 where the drilling mud is electrically treated. As a result of the electrical treatment, colloidal clayey phase of the drilling mud is deposited on the part 10b of the casing 1, and the treated drilling mud passes through the reticulate partition wall 26, pipe 3, and pipeline 27 back to the tank 21. The drilling mud being treated repeatedly circulates through the electric field of the apparatus 1 giving up its clayey phase to the part 10b of the casing 1. First, finest colloidal particles of the drilling mud are deposited in the casing 1, on its part 10b, which are continuously removed from the walls by the rotating screw 4 and transferred thereby to the receptacle 14 and further through the outlet 13 into the interior of the container 15 collecting solid phase. Since the container 15 is made of a flexible corrugated material, a back pressure develops causing a compaction of clayey phase in the interior of the container. Under the action of the electric field, additional separation of liquid phase occurs within the compacted clayey phase. The negatively charged container 15 repells negatively charged colloidal clayey particles, while allowing the filtrate to pass through unhampered. The separated filtrate passes into the annular space between the containers 15 and 16 and through the openings 18, is drained into the collector 19 for collecting separated liquid phase and is farther fed back to the tank 21.

By changing the number of cycles of circulation of drilling mud through the casing 1 and by varying the intensity of current, colloidal phase of drilling mud having one and the same particles size may be collected in the receptacle 14. After the finest fraction is separated, the receptacle for collecting solid phase is replaced by an empty receptacle, and the intensity of current is increased to circulate the drilling mud through the casing 1 for a desired number of cycles so as to collect a coarser fraction, and so on.

The receptacle 14 for collecting solid phase may be then used for the storage and transportation of the separated paste-like mud to another site for re-use. Connecting the screw 4 and container 15 to the negative terminal of the d-c source 8 prevents clayey particles from sticking thereto.

Therefore, the apparatus for electrokinetically separating drilling mud into solid phase and liquid phase is highly efficient in separating finest colloidal phase rich in chemical reagents and makes it possible to obtain a paste of drilling mud for subsequent use.

Economical efficiency of the apparatus for separating drilling mud into solid and liquid phases according to the invention is determined by reduced cost of chemical reagents used for the preparation of drilling mud and maintenance of its parameters, increased drilling speed owing to a better quality of drilling mud prepared from the paste and prolonged life of drilling mud.

Industrial Applicability

The apparatus according to the invention may be most advantageously used for drilling oil and gas production wells, and geological prospecting boreholes. The apparatus may also be used in the chemical industry for the manufacture of construction materials and in other industries where it is necessary to separate a solid phase from a suspension.

What is claimed is:

1. An apparatus for electrokinetically separating drilling mud into liquid and solid phases, comprising a casing having an inlet for drilling mud and outlets for separated phases thereof and accommodating electrodes connected to the negative terminal and to the positive terminal respectively, of a d-c source, characterized in that the electrode connected to the negative terminal of the d-c source (8) comprises a conveyor screw (4) having a cylindrical portion (5) and an adjacent conical portion (6), the screw being installed in the casing (1) which forms the electrode connected to the positive terminal of the d-c source (8) and has respective cylindrical (10a, 10b, 10c) and conical (11) portions, the outlet (13) for solid phase of drilling mud being provided at the end of the conical portion (11) of the casing (1), and in that there is provided a receptacle (14) for collecting solid phase of drilling mud communicating with the outlet (13) for solid phase of drilling mud provided in the casing (1).

2. An apparatus according to claim 1, characterized in that the receptacle (14) for collecting solid phase comprises two coaxially arranged containers (15, 16) made of a flexible corrugated material, the inner container (15) being made of a reticulate electrically conducting material, connected to the negative terminal of the d-c source (8) and communicating with the outlet (13) for solid phase provided in the casing (1), and the outer container (16) being made of a non-conducting material and having openings for draining liquid phase.

3. An apparatus according to claim 1, characterized in that the outlet (3) for liquid phase is provided within the conical portion (11) of the casing (1) through a reticulate partition wall (26).

4. An apparatus according to claim 1, characterized in that the cylindrical portion of the casing consists of three parts (10a, 10b, 10c) of which the intermediate part (10b) is electrically insulated form the end parts (10a, 10c) and functions as an anode.

5. An apparatus according to claim 1, characterized in that blades (9) of the screw (4) and the conical portion (6) thereof are made of an insulating material, and the shaft (7) of the screw is made of an electrically conducting material.

6. An apparatus according to claim 2, characterized in that a collector (19) for collecting separated liquid phase is provided under the outer container (16).

* * * * *